Dec. 26, 1944.  R. C. OSGOOD  2,365,773
MATERIAL HANDLING APPARATUS
Filed Feb. 18, 1942  7 Sheets-Sheet 1

Inventor:
Robert C. Osgood
by
Louis A. Maxim
Att'y.

Dec. 26, 1944. R. C. OSGOOD 2,365,773
MATERIAL HANDLING APPARATUS
Filed Feb. 18, 1942 7 Sheets-Sheet 2
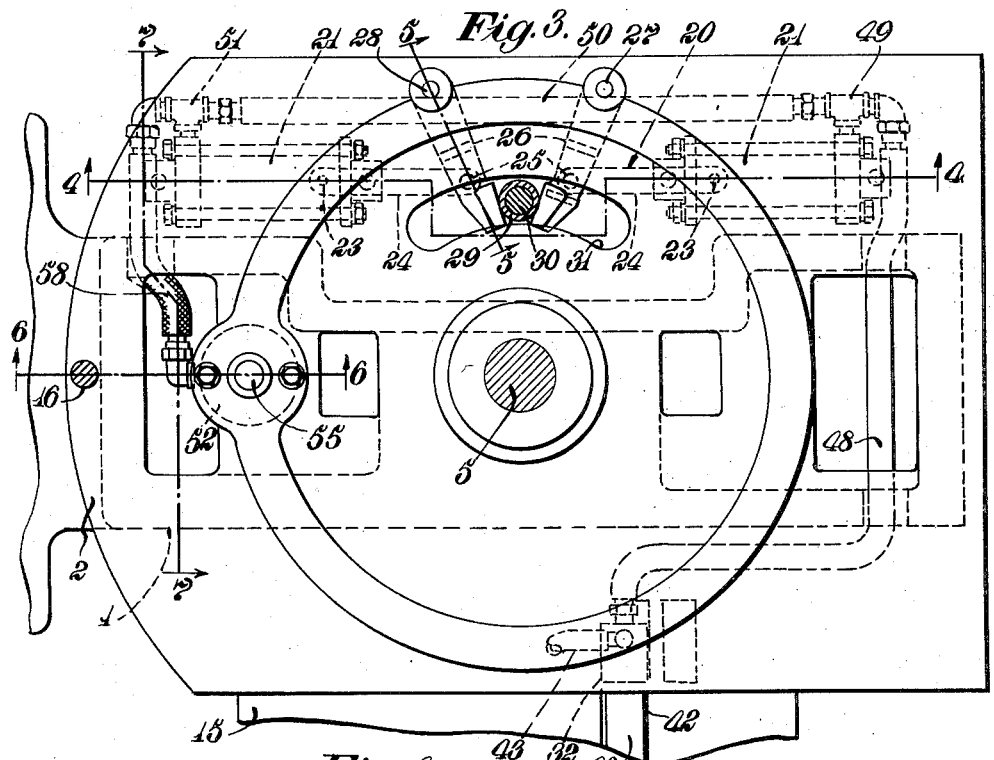
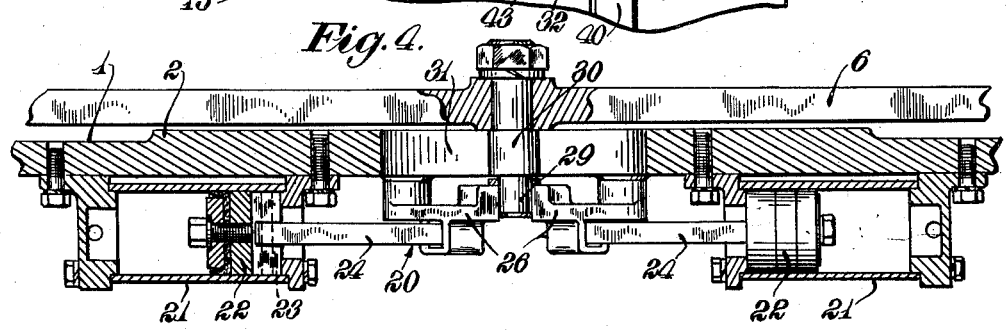
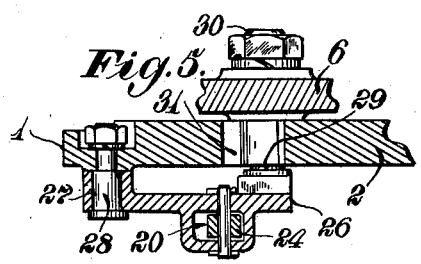
Inventor:
Robert C. Osgood
by
Atty.

Dec. 26, 1944.   R. C. OSGOOD   2,365,773
MATERIAL HANDLING APPARATUS
Filed Feb. 18, 1942   7 Sheets-Sheet 3

Inventor:
Robert C. Osgood.
by
Atty.

Dec. 26, 1944.   R. C. OSGOOD   2,365,773
MATERIAL HANDLING APPARATUS
Filed Feb. 18, 1942   7 Sheets-Sheet 4

Inventor:
Robert C. Osgood,
by
Louis A. Maxson
Atty.

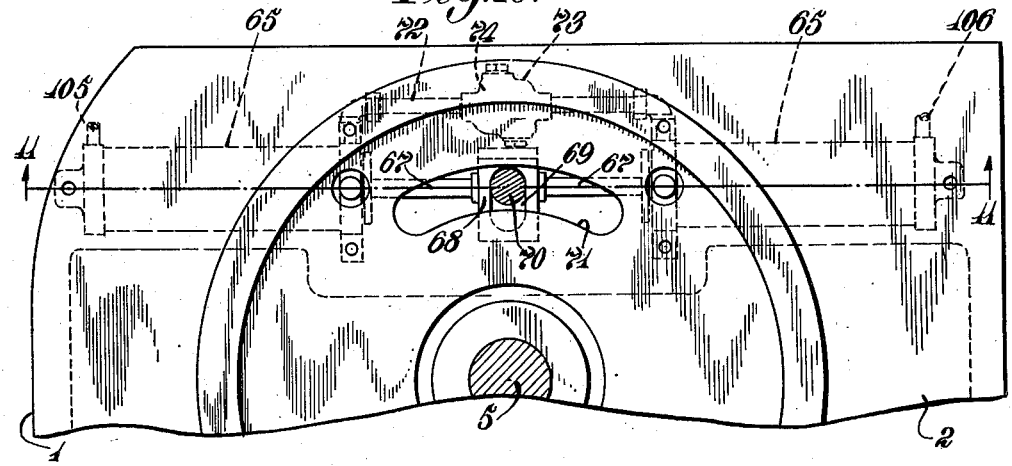
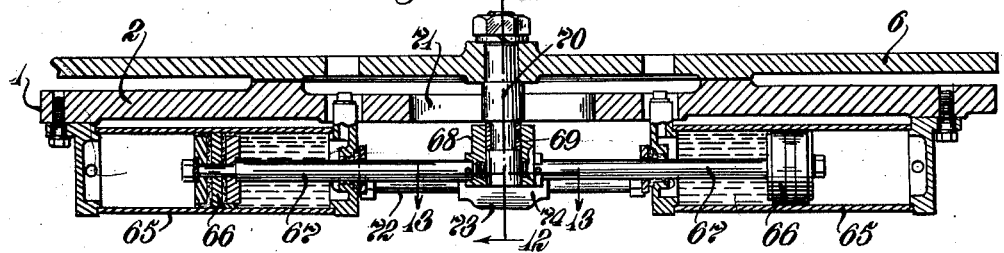
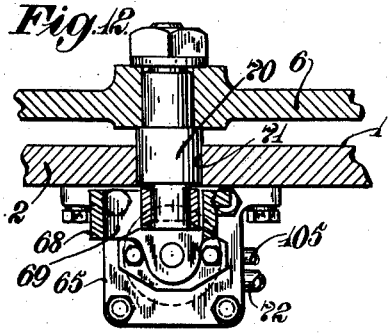
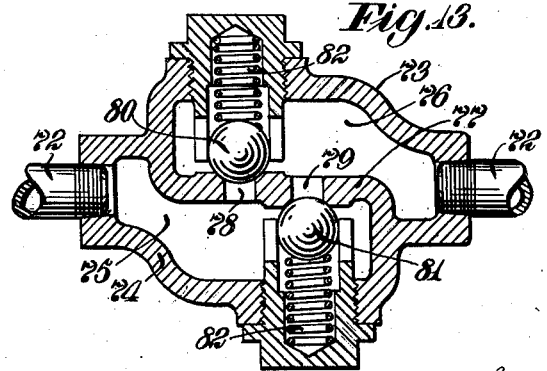

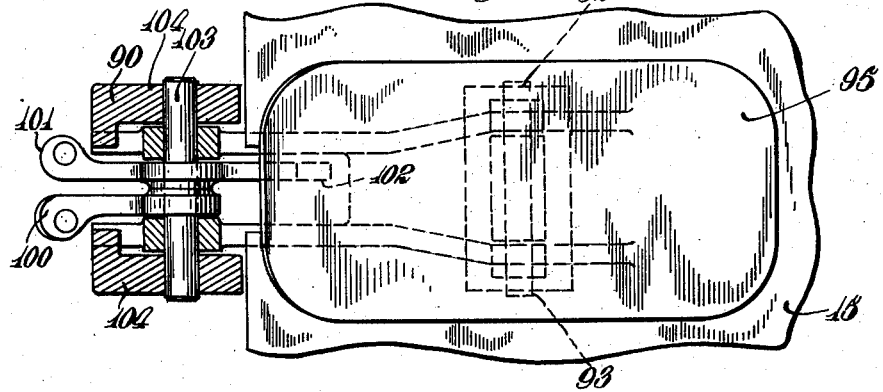
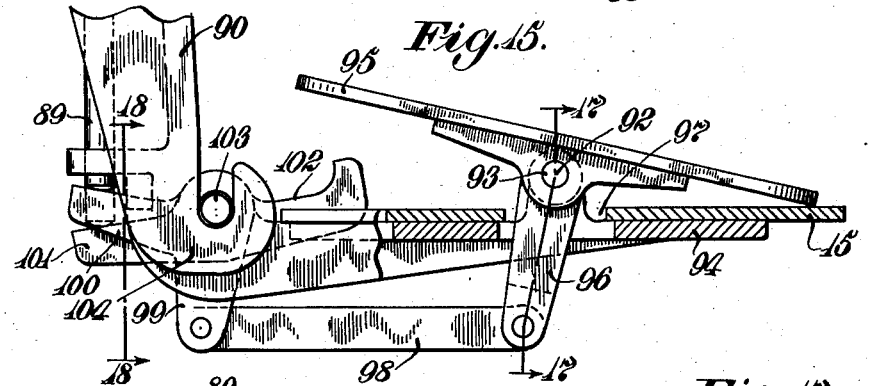
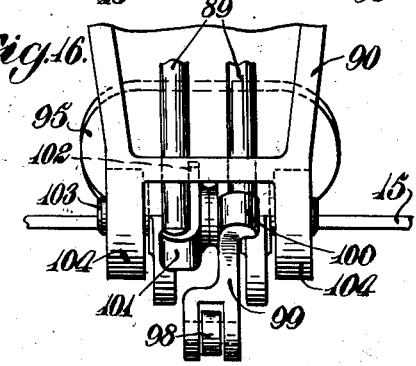
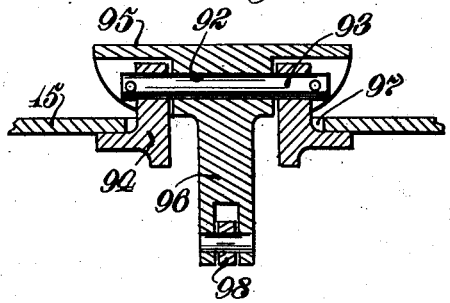
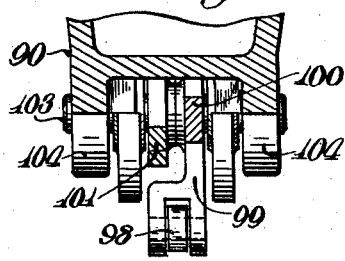

Dec. 26, 1944. R. C. OSGOOD 2,365,773
MATERIAL HANDLING APPARATUS
Filed Feb. 18, 1942 7 Sheets-Sheet 7

Inventor:
Robert C. Osgood.
by
Louis A. Maxson
Att'y.

Patented Dec. 26, 1944

2,365,773

UNITED STATES PATENT OFFICE 2,365,773

MATERIAL HANDLING APPARATUS

Robert C. Osgood, Claremont, N. H., assignor to Sullivan Machinery Company, a corporation of Massachusetts Application February 18, 1942, Serial No. 431,409

17 Claims. (Cl. 214—132)

This invention relates to material handling apparatus, and more particularly to improvements in horizontally swingable load supports having improved power operated means for swinging the same and for holding the load support in adjusted position.

In material handling apparatus of the kind known as mine car loaders, a vertically swingable shovel is usually mounted on a horizontal turntable and is swingable horizontally with the turntable relative to the loader base, so that the shovel can be positioned at either side of the path of movement of the loader. Means is usually provided for swinging the turntable during the loading operation, i. e. during raising of the shovel, so that the shovel is centered or alined with respect to the loader base, before the shovel assumes its raised dumping position to assure discharge of the shovel contents in a mine car or other receptacle located at the rear of the loader. The turning or swinging means for the turntable is usually power operated and may be operator controlled, so that the swinging of the turntable may be effected at the operator's will. Such mine car loaders are usually driven by pressure fluid motors, and the turntable turning and locating means is ofttimes actuated by pressure fluid.

An object of the present invention is to provide an improved material handling apparatus having improved means for swinging the horizontally swingable load support thereof. Another object is to provide an improved power operated means for swinging the shovel of a mine car loader horizontally with respect to the loader base. Yet another object is to provide an improved shovel centering mechanism for the shovel of a mine car loader whereby the discharge of the shovel contents into a mine car located at the rear of the loader is assured. Yet another object is to provide an improved power operated mechanism for swinging the turntable which carries the shovel of a mine car loader, whereby the shovel may be moved horizontally with respect to the loader base during the loading operation. A still further object is to provide an improved shovel swinging mechanism of the pressure fluid actuated type whereby the shovel of a mine car loader may be swung horizontally relative to the loader base during the loading operation. Still another object is to provide an improved shovel swinging mechanism of the pressure fluid operated and hydraulically controlled type. A further object is to provide an improved swinging mechanism of a novel construction and arranged in a novel manner. How these and other objects are accomplished, and the advantageous features of the invention, will be best understood from the following detailed description wherein preferred and modified embodiments are set forth, reference for the purpose being had to the accompanying drawings, in which:

Fig. 3 is an enlarged horizontal sectional view taken substantially on line 3—3 of Fig. 1, with parts omitted to facilitate illustration.

Fig. 4 is an enlarged vertical sectional view taken substantially on line 4—4 of Fig. 3.

Fig. 5 is an enlarged detail vertical sectional view taken on line 5—5 of Fig. 3.

Fig. 10 is a fragmentary horizontal sectional view, similar to Fig. 3, illustrating another form of construction.

Fig. 11 is a vertical sectional view taken substantially on line 11—11 of Fig. 10.

Fig. 12 is a detail vertical sectional view taken substantially on line 12—12 of Fig. 11.

Fig. 13 is a horizontal sectional view illustrating the check valve mechanism, the view taken on line 13—13 of Fig. 11.

Fig. 14 is a plan view, with parts in horizontal section, illustrating the operating means for the control valve mechanism.

Fig. 15 is a side elevational view, with parts in vertical section, of the valve operating means shown in Fig. 14.

Fig. 16 is an end elevational view of the operating means shown in Fig. 15.

Fig. 17 is a vertical sectional view taken on line 17—17 of Fig. 15.

Fig. 18 is a vertical sectional view taken on line 18—18 of Fig. 15.

In both illustrative embodiments of the invention the improved shovel swinging mechanism is associated with a material handling apparatus of the kind commonly known as a mine car loader for loading loose rock, or other loose debris, from a mine floor into a mine car or other receptacle. This mine car loader may be of the same general kind as that disclosed in my Patents No. 2,201,671, granted May 21, 1940, and No. 2,268,570, granted January 6, 1942, although obviously the improved shovel swinging mechanism may be associated with material handling apparatus of other kinds.

Figure 1:
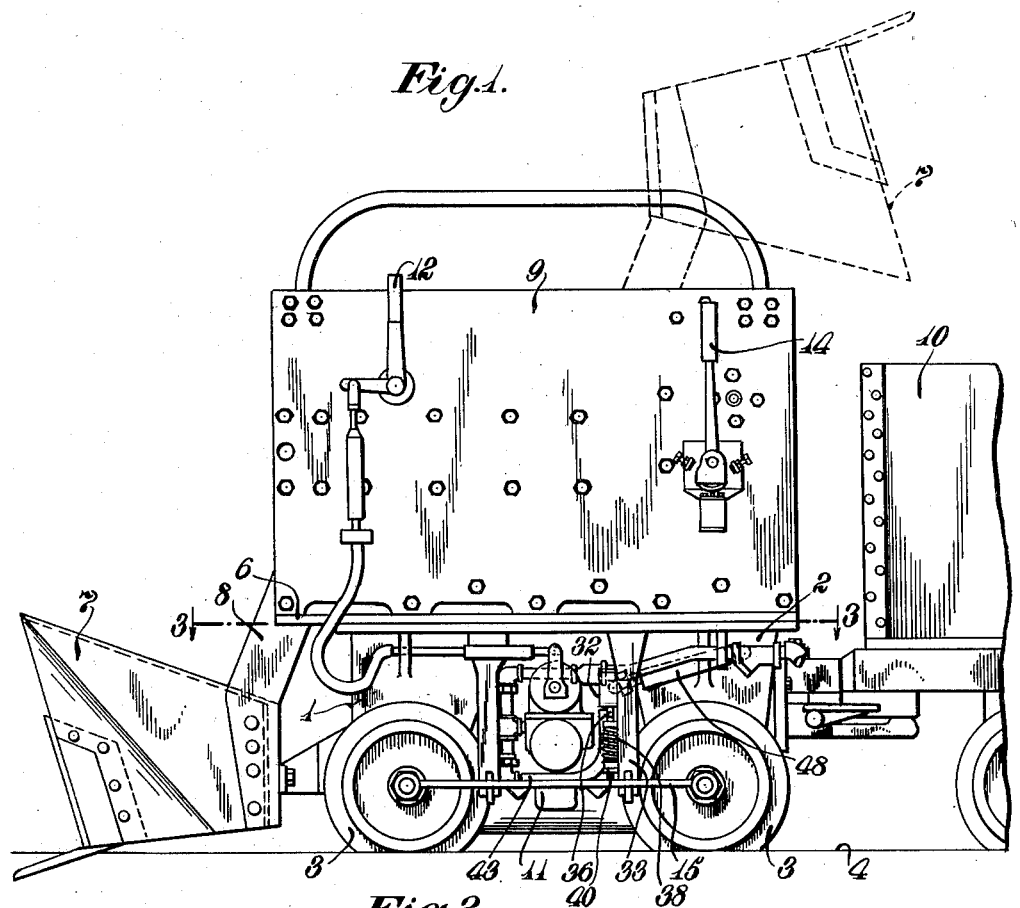
Fig. 1 is a side elevational view of a material handling apparatus with which one illustrative embodiment of the invention is associated.

The mine car loader disclosed herein comprises, as is fully described in the patents above mentioned, a portable base 1 including a truck frame 2 mounted on wheels 3 adapted to travel along a trackway 4 laid on the mine floor. Swivelled on a vertical pivot at 5 on the truck frame to swing horizontally above the truck wheels, is a horizontal turntable 6. Mounted on the turntable is a shovel 7 supported by side arms 8 in turn mounted on the turntable for guided rolling movement between vertical side frames 9, 9 secured to the frame of the turntable. The shovel 7 is supported on its rolling mounting to swing from its lowered digging position, shown in full lines in Fig. 1, upwardly over the top of the turntable to its raised dumping position shown in dotted lines in that figure. Coupled by conventional coupling means to the rear end of the loader is a conventional mine car 10 which receives the material discharged from this shovel. Arranged on the base beneath the turntable is a pressure fluid motor 11 operatively connected through gearing to the truck wheels and controlled by a hand lever 12. Mounted on the turntable is a pressure fluid motor 13 operatively connected through gearing to the shovel swinging mechanism and controlled by a hand lever 14. Arranged at one side of the loader base is a platform 15 on which the operator stands during operation of the loader, and the hand levers 12 and 14 are located at one side of the loader above the platform so that the operator may stand on this platform and readily control the operating motors 11 and 13. During transport of the loader about the mine the shovel supporting turntable is locked in alinement with the loader base by means of a locking pin 16 which is inserted through registering openings in the turntable and truck frames. As the means for supporting and swinging the shovel are fully described in the patents above referred to, further illustration and description thereof are herein unnecessary.

In the illustrative embodiment of the invention shown in Figs. 1 to 9, inclusive, the shovel swinging mechanism, generally designated 20, is arranged at one side of the loader base in a position extending longitudinally of the truck, in the manner shown in Fig. 3, and is operatively connected to the swiveled turntable frame. This swinging mechanism includes a pair of alined fluid cylinders 21, 21 containing oppositely acting reciprocable pistons 22, 22 to which are pivotally connected at 23 horizontally swingable links 24, 24, the latter in turn pivotally connected at 25 to horizontal arms 26. These arms are pivoted at 27 on vertical pivot pins 28 secured to the top of the truck frame and are swingable horizontally into engagement with a roller 29. This roller is journaled on the lower end of a vertical pin 30 secured to the swiveled turntable frame, and this pin projects vertically through an arcuate slot 31 struck on a radius from the turntable axis. The roller 29 moves horizontally with the turntable frame relative to the truck frame, and the arcuate slot in the top of the truck frame permits such movement. A control valve box 32 is secured to a bracket 33 in turn secured to the truck frame, and this valve box has a vertical bore 34 containing a spool slide valve 35. This spool slide valve has a depending stem 36 engageable with a vertically reciprocable plunger 37 guided on the bracket 33. This plunger is held depressed by a coil spring 38 and engages at its lower end a lever arm 39 integral with a foot pedal 40. This foot pedal is pivoted at 41 on the bracket 33 and projects through an opening 42 in the platform 15. A fluid conduit 43 communicable with a suitable source of pressure fluid supply is connected by a passage 44 in the valve box with the valve receiving bore 34 (see Fig. 8), and the valve receiving bore is connected to exhaust through a vent passage 45. Attached to the valve box is a suitable exhaust deflector 46. Also connected to the valve receiving bore through a passage 47 is a conduit 48 connected through pipe connections 49, 50 and 51 to the remote ends of the fluid cylinders 21. Arranged on the truck frame beneath the turntable is a vertically disposed fluid cylinder 52 containing a reciprocable piston 53 having its piston rod 54 extending upwardly within the top cylinder head, and the upper end of this piston rod has formed thereon a locking pin 55 which is adapted to extend upwardly through the top cylinder head into a locking recess 56 formed in the swiveled turntable frame. A coil spring 57 urges the piston downwardly toward its released position. A conduit 58 leads from the pipe connection 51 to a passage 59 communicating with the lower end of the cylinder 52 for supplying pressure fluid to the cylinder, so that when pressure fluid is supplied to the swinging cylinders 21, 21 it is supplied concurrently to the locking cylinder. It will thus be seen that when the shovel supporting turntable is power-swung into alinement with the loader base, it is automatically locked in such position by the locking pin 55. When the valve 35 is in the position shown in Fig. 8, the swinging cylinders 21, 21 and the locking cylinder 52 are concurrently vented to atmosphere through the conduit 48, passage 47 and the vent passage 45; and when the foot pedal 40 is depressed by the operator the slide valve 35 is raised, thereby closing the vent passage 45 and connecting the cylinders to the source of pressure fluid supply through the passages 44 and 47.

Figure 2:
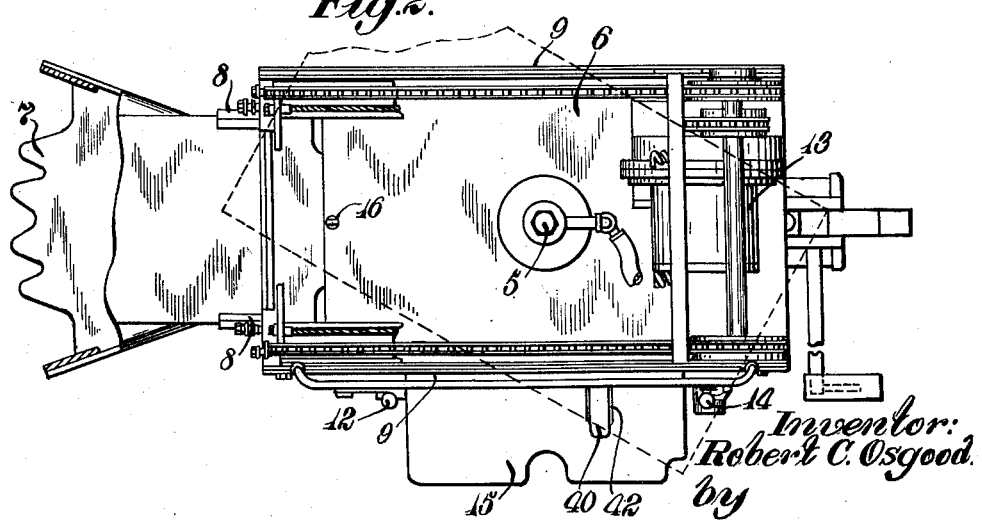
Fig. 2 is a plan view of the apparatus shown in Fig. 1, with parts broken away to illustrate structural details.
Figure 6:
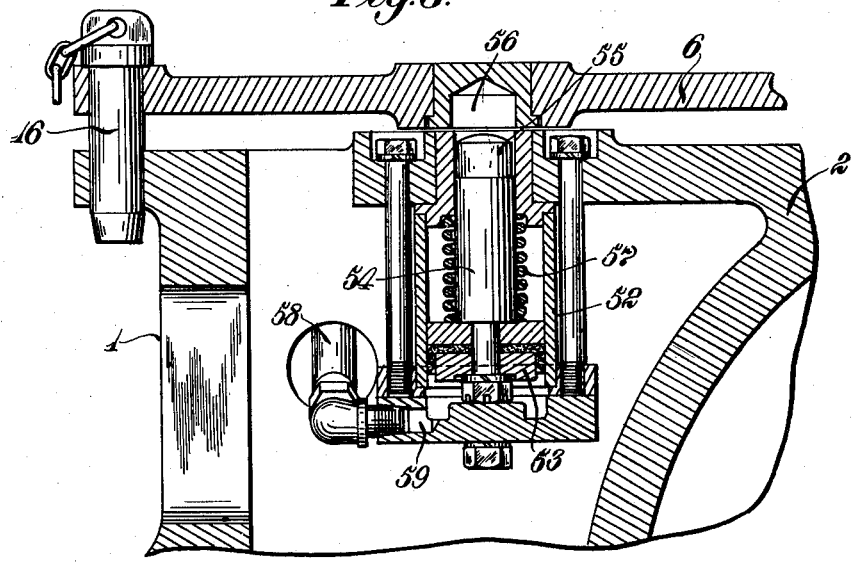
Fig. 6 is an enlarged detail vertical sectional view taken substantially on line 6—6 of Fig. 3.
Figure 7:
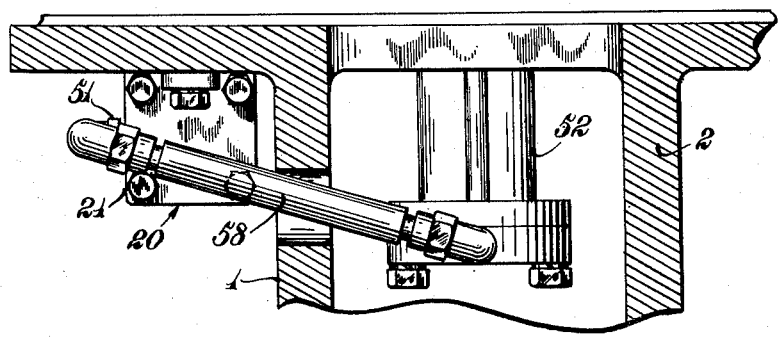
Fig. 7 is an enlarged detail vertical sectional view taken substantially on line 7—7 of Fig. 3.
Figure 8:
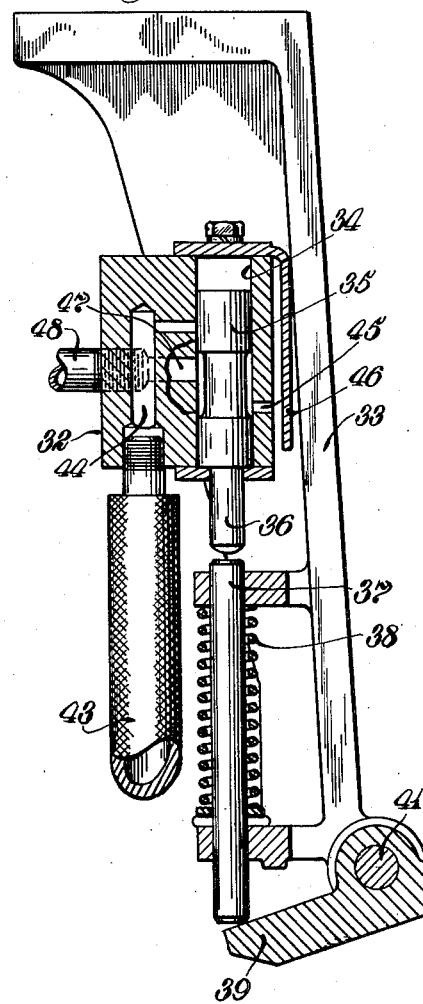
Fig. 8 is a vertical sectional view taken on line 8—8 of Fig. 9.
Figure 9:
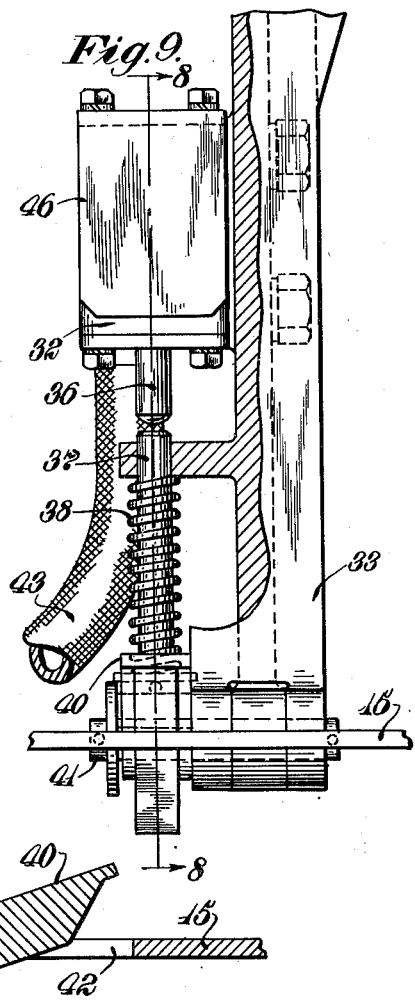
Fig. 9 is an elevational view, with parts in vertical section, of the control valve mechanism.
Figure 19:
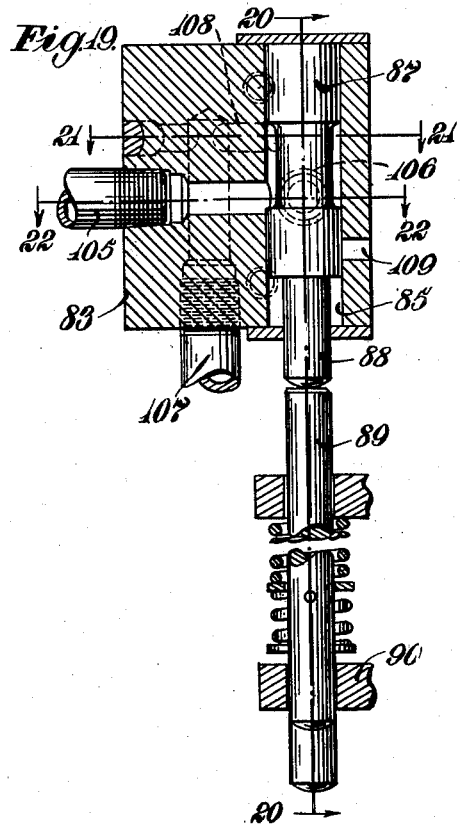
Fig. 19 is a vertical sectional view through the modified form of control valve mechanism.
Figure 20:
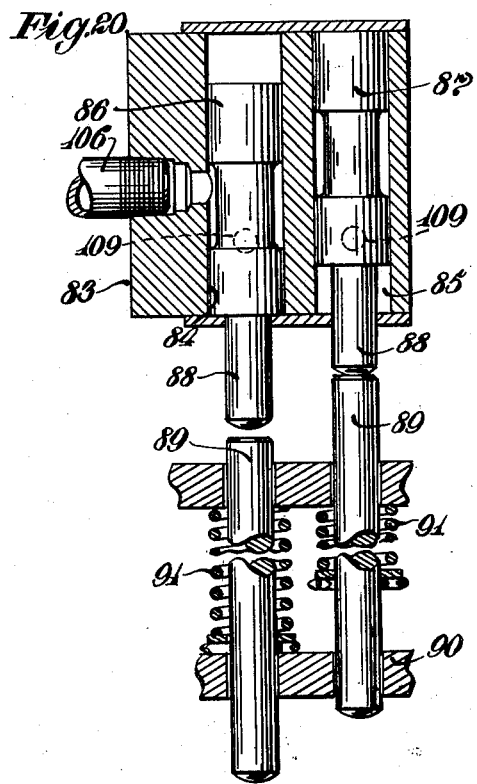
Fig. 20 is a vertical sectional view taken on line 20—20 of Fig. 19.
Figure 21:
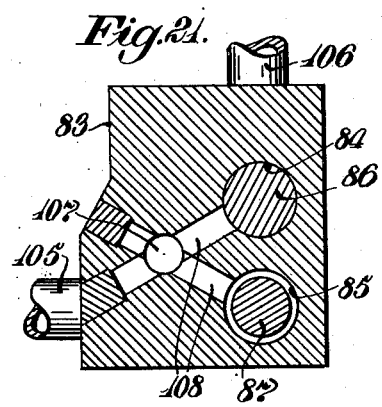
Fig. 21 is a horizontal sectional view taken on line 21—21 of Fig. 19.
Figure 22:
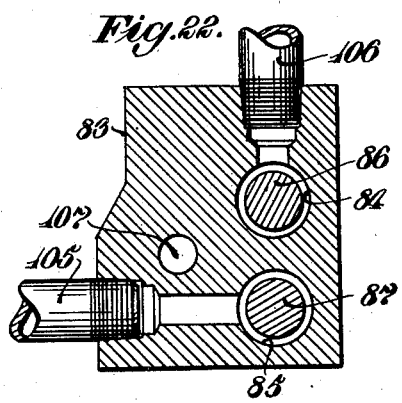
Fig. 22 is a horizontal sectional view taken on line 22—22 of Fig. 19.

By arranging the swinging and locking cylinders on the truck frame beneath the turntable, in the manner shown, the top of the turntable is left comparatively clear, as shown in Fig. 2, and, at the same time, the swinging mechanism is, to a large extent, protected by the turntable frame, due to its novel location. By the provision of the foot pedal control near the operator's platform, the operator may readily control horizontal swinging of the shovel without removing his hands from the control handles 12 and 14 for the shovel swinging and propelling motors 11 and 13.

In the illustrative embodiment of the invention shown in Figs. 10 to 22, inclusive, separate means for effecting automatic locking of the turntable frame to the truck frame when the shovel is alined with the loader base is not illustrated, though one may be provided if desired; and power rotation of the turntable in either of opposite directions is provided so that the turntable can be swung in eiher direction by power to locate the shovel at either side of the trackway. In the form of the invention hereinabove described, it is necessary manually to swing the shovel into its laterally located digging position at either side of the base, and in the novel construction now about to be described this manual swinging operation is unnecessary. In this novel construction there are arranged on the truck frame beneath the turntable a pair of alined pressure fluid and hydraulic cylinders 65, 65. These cylinders extend longitudinally along one side of the loader base, in the manner shown in Fig. 10, and reciprocable in these cylinders are pistons 66, 66 having their piston rods 67 extending outwardly through the adjacent heads of the cylinders, and these rods are secured at their adjacent ends to a block 68. This block has a transverse slot 69 through which extends a pin 70 secured to the turntable frame. This pin extends upwardly through an arcuate slot 71 in the top of the truck frame, the slot being struck on a radius from the turntable axis. The inner adjacent ends of the cylinders contain a liquid, preferably oil, and the inner ends of the cylinders are connected by a by-pass conduit 72 and check valve mechanism 73, so that the liquid can by-pass from one cylinder end to the other as the pistons are moved under the actuation of pressure fluid. This check valve mechanism preferably comprises a casing 74 having chambers 75 and 76 separated by a septum 77. This septum has orifices 78, 79 controlled by oppositely acting check valves 80 and 81. These check valves are of the ball type and are loaded by coil springs 82. This check valve mechanism thus provides a restricted by-pass between the adjacent ends of the cylinders and also serves at times to hold the pistons against movement due to the spring loading of the valves. Arranged on the truck frame beneath the turntable is a valve box 83 having parallel vertical bores 84 and 85 containing spool slide valves 86 and 87 respectively. These spool slide valves have depending stems 88 engageable with vertically reciprocable plungers 89 guided on a bracket 90 secured to the truck frame. The plungers are held depressed by coil springs 91. Pivotally mounted at 92 on a pivot pin 93 supported by a bracket 94 secured to the operator's platform 15, is a foot pedal 95. This foot pedal is provided with a depending lever arm 96 projecting downwardly through an opening 97 in the platform, and this lever arm is pivotally connected to a link 98 in turn pivotally connected to a lever arm 99 integral with a lever 100. A lever 101 has an integral lever arm 102 engageable with the pedal bottom. The lever arms 100 and 101 are pivotally mounted on a pivot pin 103 supported by projections 104 integral with the bracket 90. These lever arms 100, 101 respectively engage the lower ends of the reciprocable plungers 89, 89. When the foot pedal is pressed downwardly toward the platform into the position shown in Fig. 15, one valve plunger is raised to elevate its associated slide valve, thereby to supply pressure fluid to one of the swinging cylinders, and when the foot pedal is swung into its opposite position the other plunger is raised to elevate its slide valve, thereby to supply pressure fluid to the other swinging cylinder. The valve receiving bores are connected by conduits 105, 106 to the remote ends of the cylinders, and a supply conduit 107 is connected by passages 108 to the valve receiving bores, and the latter are connected to exhaust through vent passages 109. Thus, under the control of the spool slide valves 86, 87, fluid under pressure may be supplied to one or the other of the remote ends of the swinging cylinders 66, 66, thereby to swing the shovel supporting turntable 6 in one direction or the other about its swivel axis 5. When one swinging cylinder is connected to the source of fluid supply, the other cylinder is vented through one of the vent passages 109. The cross sectional area of the check valve control orifices 78, 79 determines the speed of turntable rotation in an obvious manner. By spring loading the check valves when the supply of pressure fluid to the cylinders is cut off and the cylinders are vented, the liquid is trapped within the adjacent ends of the cylinders to hold the turntable against rotation.

The mode of operation of the material handling apparatus is generally similar in both embodiments of the invention. The apparatus may be propelled back and forth along the mine trackway under the propulsion of the truck wheels during the loading operation, by the motor 11, and during transport of the apparatus the turntable is locked against rotation by the locking pin 16. When it is desired to effect loading, this locking pin is released and the shovel 7 may be lowered into its digging position with respect to the muck pile, and then the apparatus may be propelled forwardly along the trackway to crowd the shovel into the pile of muck. When the shovel is substantially filled it may be swung upwardly and rearwardly about its rolling mounting from its lowered digging position to its elevated dumping position. When the shovel reaches its raised dumping position, as indicated in dotted lines in Fig. 1, it is abruptly stopped by buffer devices in the manner described in the patents above referred to, so that the shovel contents are discharged into the mine car 10. When the shovel is abruptly stopped by the buffer devices, the handle 14, which controls the shovel swinging motor 13, may be operated to effect reversal of the motor so that the shovel may then swing downwardly by gravity back into its digging position as shown in full lines in Fig. 1.

In the embodiment of the invention shown in Figs. 1 to 9, inclusive, when it is desired to load muck at either side of the trackway the operator may swing manually the turntable relative to the truck frame until the shovel assumes the desired laterally located position. When the shovel is in its laterally located digging position at one side of the trackway, as indicated in dotted lines in Fig. 2, the apparatus may be propelled bodily forwardly along the trackway to dig the shovel into the muck pile to fill the shovel with muck. The operator may then operate the shovel swinging motor 13 under the control of the handle 14, to effect swinging of the shovel upwardly, and as the shovel starts to swing upwardly and clears the muck pile the operator may depress the foot pedal 40 to actuate the slide valve 35, thereby to admit pressure fluid to the turntable swinging cylinders 21, 21 so that the shovel is swung horizontally into alinement with the loader base as it swings upwardly, thereby to insure discharge of the shovel contents into the mine car 10 when the shovel reaches its raised dumping position. As the shovel supporting turntable swings horizontally into alinement with the loader base, the locking pin 55 automatically moves upwardly into the locking recess 56 to lock the turntable to the truck frame. Thus, regardless of the laterally located digging position of the shovel with respect to the loader base, when the operator depresses the pedal 40, the shovel is automatically brought into and locked in alinement with the truck. When the foot pedal is released by the operator, the swinging cylinders 21, 21 are both vented and the locking pin 55 is concurrently released.

In the modified embodiment of the invention shown in Figs. 10 to 22, inclusive, the swinging cylinders 65, 65 may not only serve to effect centering of the shovel with respect to the loader base but also to effect lateral power swinging of the shovel into its digging position at either side of the mine trackway. In this construction, when the foot pedal 95 is depressed in one direction, the shovel supporting turntable is rotated in one direction, and when the foot pedal is depressed in the opposite direction the turntable is rotated in the opposite direction, and when the foot pedal is released the turntable is automatically held against rotation by the liquid trapped in the cylinder ends by the check valve mechanism 73. The pressure of the fluid in the swinging cylinders 65, 65 during turntable rotation effects by-passing of the liquid past the loaded check valves from one cylinder end to the other, and the valve controlled orifices 78, 79 determine the speed of turntable rotation. When the slide valves 86, 87 are in the position shown in Fig. 20, one of the remote ends of the swinging cylinders 65, 65 is connected to exhaust while the other remote end of the swinging cylinder is connected to the source of pressure fluid, and when the positions of the valves are reversed, the vent and pressure fluid supply connections with the cylinders are reversed. It will of course be appreciated that a positive locking means and suitable control means therefor may be provided if desired.

As the general mode of operation of a mine car loader of the kind disclosed is clearly described in the patents above referred to and is well known to those skilled in the art, further description thereof is herein unnecessary. Instead of arranging the fluid cylinders in the alined position shown at one side of the loader base, it will be evident that various other arrangements may be resorted to if desired. The arrangement disclosed, however, lends itself to compactness, and is deemed the most suitable in the particular construction disclosed.

As a result of this invention it will be noted that an improved mine car loader is provided especially designed for use in loading muck in underground mining work. It will further be noted that by the provision of the improved means for swinging the shovel horizontally with respect to the loader base, the shovel may be alined with the loader base as it swings upwardly from its lowered digging position to its raised dumping position, thereby to insure discharge of the muck into a mine car located at the rear of the apparatus. Furthermore, by arranging the novel shovel swinging means on the loader base beneath the turntable, the swinging connections are not only simplified but also the swinging means is, to a large extent, protected. By the provision of the foot pedal control conveniently arranged in adjacency to the operator's platform, the operator may readily control horizontal swinging of the shovel without removing his hands from the control handles for the shovel propelling and swinging motors. Other uses and advantages of the improved material handling apparatus will be clearly apparent to those skilled in the art.

While there are in this application specifically described two embodiments which the invention may assume in practice, it will be understood that these embodiments of the same are shown for purposes of illustration and that the invention may be further modified and embodied in various other forms without departing from its spirit or the scope of the appended claims.

What I claim as new and desire to secure by Letters Patent is:

1. In a swinging mechanism, a support, a frame swiveled on said support to swing horizontally relative thereto, and self-centering means for automatically swinging said frame from either side of said support into longitudinal alinement with said support and for holding the same in centered position with respect to said support, said self-centering and holding means including a pair of fluid cylinders arranged in alinement and extending longitudinally of said support along one side thereof beneath said swiveled frame, and oppositely acting pistons contained in said cylinders and operatively connected to said frame, said pistons being operable to swing said frame, one piston being operable to swing said frame only in one direction and the other piston being operable to swing said frame only in the opposite direction, and said pistons being at the ends of their working strokes when said frame assumes its centered position with respect to said support.

2. In a swinging mechanism, a support, a frame swiveled on said suport to swing horizontally relative thereto, and self-centering means for automatically swinging said frame from either side of said support into longitudinal alinement with said support and for holding the same in centered position with respect to said support, said self-centering and holding means including a pair of fluid cylinders arranged in alinement and extending longitudinally of said support along one side thereof beneath said swiveled frame, oppositely acting pistons contained in said cylinders and operatively connected to said frame, said pistons being operable to swing said frame, one piston being operable to swing said frame only in one direction and the other piston being operable to swing said frame only in the opposite direction, and said pistons being at the ends of their working strokes when said frame assumes its centered position with respect to said support, and means for supplying pressure fluid concurrently to said cylinders to act on said pistons in directions tending to move the latter concurrently in opposite directions.

3. In a swinging mechanism, a support, a frame swiveled on said support to swing horizontally relative thereto, a pair of fluid cylinders arranged in alinement and extending longitudinally of said support along one side thereof beneath said swivel frame, oppositely acting pistons contained in said cylinders and operatively connected to said swivel frame, means for supplying pressure fluid to the remote ends of said cylinders, there being a liquid contained within the adjacent ends of said cylinders, and a valve-controlled by-pass for conducting liquid between said adjacent cylinder ends.

4. In a swinging mechanism, a support, a frame swiveled on said support to swing horizontally relative thereto into alinement with said support, a pair of fluid cylinders arranged in alinement and extending longitudinally of said support along one side thereof beneath said swivel frame, oppositely acting pistons contained in said cylinders and operatively connected to said swivel frame, and means for automatically locking said frame to said support when said alined relation is assumed.

5. In a swinging mechanism, a support, a frame swiveled on said support to swing horizontally relative thereto into alinement with said support, a pair of fluid cylinders arranged in alinement and extending longitudinally of said support along one side thereof beneath said swivel frame, oppositely acting pistons contained in said cylinders and operatively connected to said swivel frame, means for automatically locking said frame to said support when said alined relation is assumed, and means for supplying pressure fluid concurrently to said cylinders and said locking means.

6. In a swinging mechanism of the character disclosed, a pair of alined cylinders, oppositely acting pistons reciprocable in said cylinders, a pair of oppositely acting swinging elements engageable with a member to be swung, one swinging element operated by each of said pistons, and means for supplying pressure fluid concurrently to the remote ends of said cylinders to act on said pistons in directions tending to move them in opposite directions, one piston being operable on its swinging element to effect swing only in one direction and the other piston being operable on its swinging element to effect swing only in the opposite direction, and said pistons being at the ends of their working strokes when the central position of swing is reached.

7. In a swinging mechanism, a support, a frame swiveled on said support, and means for swinging said frame about its swivel relative to said support including swinging devices on said support beneath said swivel frame and operatively connected to said swivel frame, said swinging devices embodying means controllable at the will of the operator for imparting to said frame a swinging torque discontinued automatically at approximately the horizontal centered position of said frame with respect to said support, said swinging devices including alined cylinders extending longitudinally of said support at one side thereof and oppositely acting pistons contained in said cylinders and operatively connected to said swiveled frame.

8. In a swinging mechanism of the character disclosed, a pair of alined cylinders, oppositely acting pistons contained in said cylinders and operatively connected to an element to be swung, said pistons being alternately effective to effect swing, one piston acting to effect swing in only one direction and the other piston acting to effect swing only in the opposite direction, means for supplying pressure fluid alternately to the remote ends of said cylinders, and a restricted by-pass valve mechanism actuated by the pressure of the fluid in the inner adjacent ends of said cylinders for connecting said adjacent cylinder ends and through which fluid restrictedly flows in either direction and serving to hold said pistons in stationary position when flow of pressure fluid to the remote ends of said cylinders is discontinued.

9. In a swinging mechanism, a frame swiveled on said support, and means for swinging said frame about its swivel relative to said support including oppositely acting swinging devices arranged on said support longitudinaly along one side thereof beneath said frame, said devices operatively connected to said swiveled frame and embodying means controllable at the will of the operator for imparting to said frame a swinging torque discontinued automatically at approximately the horizontal centered position of said frame with respect to said support.

10. In a swinging mechanism, a support, a frame swiveled on said support, and means for swinging said frame about its swivel relative to said support including swinging devices on said support beneath said swivel frame and operatively connected to said swivel frame, said swinging devices embodying means controllable at the will of the operator for imparting to said frame a swinging torque discontinued automatically at approximately the horizontal centered position of said frame with respect to said support, said swinging devices including alined cylinders extending longitudinally of said support at one side thereof, pistons contained in said cylinders, a roller carried by said swiveled frame and arms pivotally mounted on said support and engaging said roller, said arms actuated by said pistons respectively.

11. In a swinging mechanism of the character disclosed, a pair of alined cylinders, oppositely acting pistons contained in said cylinders, means for supplying pressure fluid concurrently to the remote ends of said cylinders, a pair of pivotal arms to which said pistons are respectively connected, and a member on an element to be swung and engaged by said arms.

12. In a swinging mechanism of the character disclosed, a pair of cylinders, oppositely acting pistons contained in said cylinders and operatively connected to an element to be swung, means for supplying pressure fluid alternately to an end of said cylinders, there being a liquid contained in the opposite ends of said cylinders, a by-pass for conducting liquid between said opposite cylinder ends, and spring-loaded check valves actuated by the liquid in said by-pass for controlling liquid flow in opposite directions through said by-pass between said opposite cylinder ends.

13. In a swinging mechanism, a support, a frame swiveled on said support, and means for automatically swinging said swiveled frame with respect to said support irrespective of the swiveled position of said frame including a pair of oppositely acting thrust exerting devices arranged in alinement on said support longitudinally along one side thereof beneath said swiveled frame, said devices including oppositely acting thrust exerting elements operatively connected to said frame, one element acting to swing said frame in only one direction and the other acting to swing said frame only in an opposite direction, and means for concurrently applying operating forces to said devices.

14. In a swinging mechanism of the character disclosed, a pair of cylinders, oppositely acting pistons contained in said cylinders and operatively connected to an element to be swung, means for supplying pressure fluid alternately to an end of each cylinder to act on said pistons, one piston acting to effect swing in only one direction and the other piston acting to effect swing only in the opposite direction, there being liquid contained in the opposite ends of said cylinders, and a restricted valve controlled bypass embodying liquid actuated valve means for permitting a restricted flow of liquid in either direction between said opposite cylinder ends, the liquid serving to hold said pistons in stationary position when fluid flow to the other ends of said cylinders is discontinued.

15. In a swinging mechanism, a support, a frame swiveled on said support, and means for automatically swinging said swiveled frame with respect to said support irrespective of the swiveled position of said frame including a pair of oppositely acting thrust exerting devices arranged in alinement on said support longitudinally along one side thereof beneath said swiveled frame, said devices including oppositely acting thrust exerting elements operatively connected to said frame, one element acting to swing said frame only in one direction and the other acting to swing said frame only in an opposite direction, said elements when they reach the ends of their working strokes automatically discontinuing frame swing, and means for concurrently applying operating forces to said devices.

16. In a reversible swinging mechanism of the character disclosed, oppositely acting swinging devices each actuated in one direction by pressure fluid, operator controlled means for supplying pressure fluid to said devices, one device acting to effect swing only in one direction and the other device acting to effect swing only in the opposite direction, and liquid resistance means embodying liquid actuated valve means for permitting a restricted flow of liquid between said devices for opposing the actuation of said devices by pressure fluid and for holding said devices against movement in either direction when the pressure fluid supply thereto is discontinued.

17. In a reversible swinging mechanism of the character disclosed, oppositely acting swinging devices each actuated in one direction by pressure fluid, operator controlled means for supplying pressure fluid to said devices, one device acting to effect swing only in one direction and the other device acting to effect swing only in the opposite direction, and liquid resistance means for permitting a restricted flow of liquid between said devices for opposing the actuation of said devices by pressure fluid and for holding said devices against movement in either direction when the pressure fluid supply thereto is discontinued, said liquid resistance means embodying a restricted valve controlled bypass means embodying liquid actuated bypass valves for permitting restricted flow of liquid in either direction between said devices.

ROBERT C. OSGOOD.